US012579124B2

(12) United States Patent　　　　(10) Patent No.:　US 12,579,124 B2
Paulraj et al.　　　　　　　　　　　　(45) Date of Patent:　　Mar. 17, 2026

(54) ZERO-CODE APPROACH FOR MODEL VERSION UPGRADES

(71) Applicant: Honeywell International Inc., Charlotte, NC (US)

(72) Inventors: Benz Paulraj, Malleshpalya (IN); Shubham Mishra, Bengaluru (IN); Shilpa Ambarkar, Banalore (IN)

(73) Assignee: Honeywell International Inc., Charlotte, NC (US)

( * ) Notice: Subject to any disclaimer, the term of this patent is extended or adjusted under 35 U.S.C. 154(b) by 179 days.

(21) Appl. No.: 18/316,156

(22) Filed: May 11, 2023

(65) Prior Publication Data

US 2024/0378186 A1　　　Nov. 14, 2024

(51) Int. Cl.
　　*G06F 16/23*　　　　(2019.01)
　　*G06F 21/55*　　　　(2013.01)
(52) U.S. Cl.
　　CPC ............ *G06F 16/23* (2019.01); *G06F 21/552* (2013.01); *G06F 2221/033* (2013.01)
(58) Field of Classification Search
　　CPC ... G06F 16/23; G06F 21/552; G06F 2221/033
　　See application file for complete search history.

(56) References Cited

U.S. PATENT DOCUMENTS 5,806,078 A　*　9/1998　Hug ......................... G06F 40/18
　　　　　　　　　　　　　　　　　　　　707/999.203
10,838,716 B1 *　11/2020　Walters ..................... G06F 8/30

| | | | | |
|---|---|---|---|---|
| 2004/0243589 | A1* | 12/2004 | Gu | ..................... G06F 16/24542 |
| 2008/0195677 | A1* | 8/2008 | Sudhakar | ............ G06F 16/1873 |
| 2018/0253728 | A1* | 9/2018 | Hanis | ................. G06Q 20/4016 |
| 2019/0303980 | A1* | 10/2019 | Yan | ..................... G06Q 30/0275 |
| 2020/0005312 | A1* | 1/2020 | Bull | ...................... G08B 13/22 |
| 2022/0012251 | A1* | 1/2022 | Colcord | ............... G06F 16/221 |
| 2023/0418831 | A1* | 12/2023 | Vadlamani | ......... G06Q 30/0202 |
| 2024/0070163 | A1* | 2/2024 | Parks | .................... G06F 16/254 |
| 2024/0386028 | A1* | 11/2024 | Blum | .................... G06F 16/254 |

OTHER PUBLICATIONS

Schema on read modeling approach as a basis of big data analytics integration in EIS (Year: 2018).*

* cited by examiner

*Primary Examiner* — Techane Gergiso
*Assistant Examiner* — Jacob Benedict Knackstedt

(57)　　　　　　　　ABSTRACT

Systems and methods for a zero-code approach for model version upgrades are described herein. For example, a system includes memory. The system further includes a processor that receives source data from data sources; applies an ingestion process to the source data for storing storage data in a data storage repository; generates models from the storage data; applies an output process to generate output schemas based on the generated models; and applies the output schemas for providing data. Also, the source data and the models changes over time leading to different data type collections. Further, at least one of applying the ingestion and the output process includes performing a dynamic merge on the different data type collections to create a merged data type collection; acquiring a user-defined configuration for the merged data type collection; and generating an output schema to the merged data type collection based on the user-defined configuration.

20 Claims, 11 Drawing Sheets

100

A →

531

| C1 | C2 | C3 | C4 | C5 |
|----|----|----|----|----|
| 1 | A1 | B1 | X1 | 10 |
| 2 | A2 | B2 | Y1 | 6 |

B →

533

| C1 | C2 | C3 | C4 | C5 | E1 | E2 |
|----|----|----|----|----|----|----|
| 1 | A1 | B1 | X1 | 10 | M1 | N1 |
| 2 | A2 | B2 | Y1 | 6 | M2 | N2 |

C →

535

| C1 | C2 | C3 | C5 | E1 |
|----|----|----|----|----|
| 1 | A1 | B1 | 10 | M1 |
| 2 | A2 | B2 | 6 | M2 |

D →

537

| C1 | C3 | C4 | C5 | C6 |
|----|----|----|----|----|
| 1 | B1 | X1 | 10 | Null |
| 2 | B2 | Y1 | 6 | Null |
| 3 | B3 | Z1 | 9 | Z3 |
| 4 | B4 | A1 | 4 | Z4 |

E →

539

| C1 | C2 | C3 | C4 | C5 | C6 | E1 | E2 |
|----|----|----|----|----|----|----|----|
| 1 | A1 | B1 | X1 | 10 | Null | M1 | N1 |
| 2 | A2 | B2 | Y1 | 6 | Null | M2 | N2 |
| 3 | Null | B3 | Z1 | 9 | Z3 | M3 | N3 |
| 4 | Null | B4 | A1 | 4 | Z4 | M4 | N4 |

F →

541

| C1 | C3 | C5 | E1 | C6 |
|----|----|----|----|----|
| 1 | B1 | 10 | M1 | Null |
| 2 | B2 | 6 | M2 | Null |
| 3 | B3 | 9 | M3 | Z3 |
| 4 | B4 | 4 | M4 | Z4 |

Figure 5C:
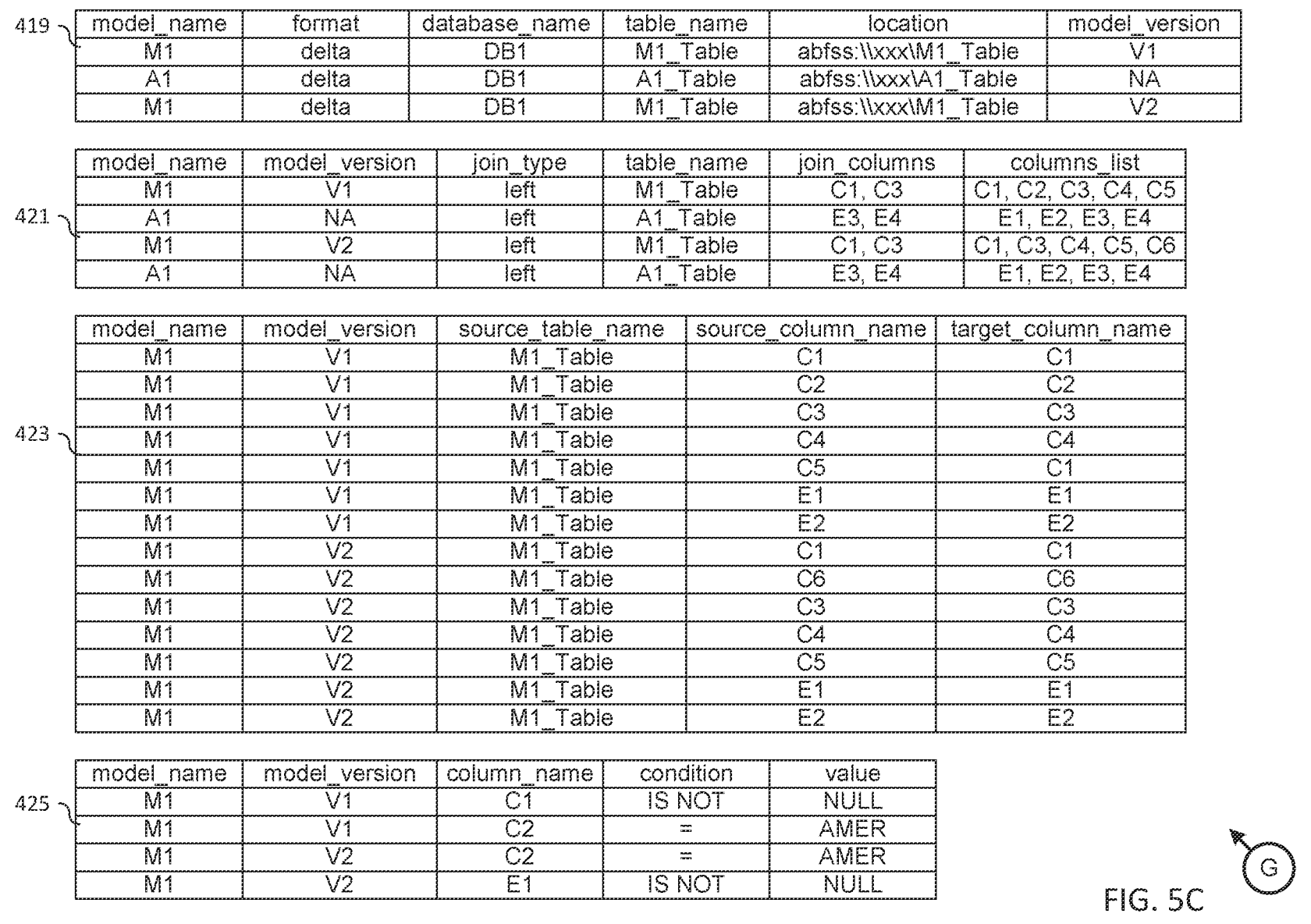

| model_name | format | database_name | table_name | location | model_version |
|---|---|---|---|---|---|
| M1 | delta | DB1 | M1_Table | abfss:\\xxx\M1_Table | V1 |
| A1 | delta | DB1 | A1_Table | abfss:\\xxx\A1_Table | NA |
| M1 | delta | DB1 | M1_Table | abfss:\\xxx\M1_Table | V2 |

421

| model_name | model_version | join_type | table_name | join_columns | columns_list |
|---|---|---|---|---|---|
| M1 | V1 | left | M1_Table | C1, C3 | C1, C2, C3, C4, C5 |
| A1 | NA | left | A1_Table | E3, E4 | E1, E2, E3, E4 |
| M1 | V2 | left | M1_Table | C1, C3 | C1, C3, C4, C5, C6 |
| A1 | NA | left | A1_Table | E3, E4 | E1, E2, E3, E4 |

423

| model_name | model_version | source_table_name | source_column_name | target_column_name |
|---|---|---|---|---|
| M1 | V1 | M1_Table | C1 | C1 |
| M1 | V1 | M1_Table | C2 | C2 |
| M1 | V1 | M1_Table | C3 | C3 |
| M1 | V1 | M1_Table | C4 | C4 |
| M1 | V1 | M1_Table | C5 | C1 |
| M1 | V1 | M1_Table | E1 | E1 |
| M1 | V1 | M1_Table | E2 | E2 |
| M1 | V2 | M1_Table | C1 | C1 |
| M1 | V2 | M1_Table | C6 | C6 |
| M1 | V2 | M1_Table | C3 | C3 |
| M1 | V2 | M1_Table | C4 | C4 |
| M1 | V2 | M1_Table | C5 | C5 |
| M1 | V2 | M1_Table | E1 | E1 |
| M1 | V2 | M1_Table | E2 | E2 |

425

| model_name | model_version | column_name | condition | value |
|---|---|---|---|---|
| M1 | V1 | C1 | IS NOT | NULL |
| M1 | V1 | C2 | = | AMER |
| M1 | V2 | C2 | = | AMER |
| M1 | V2 | E1 | IS NOT | NULL |

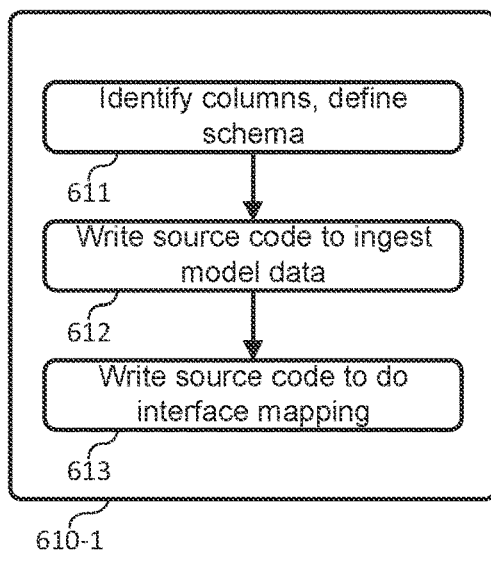

Identify columns, define schema

611

Write source code to ingest model data

612

Write source code to do interface mapping

613

610-1

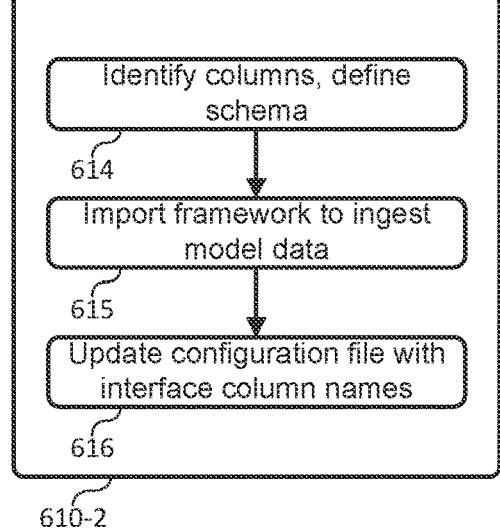

Identify columns, define schema

614

Import framework to ingest model data

615

Update configuration file with interface column names

616

610-2

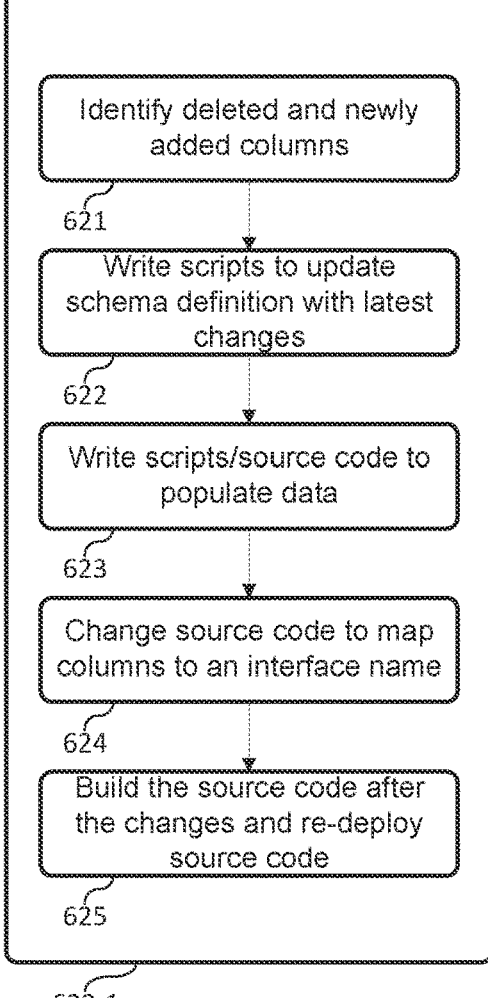

Identify deleted and newly added columns

621

Write scripts to update schema definition with latest changes

622

Write scripts/source code to populate data

623

Change source code to map columns to an interface name

624

Build the source code after the changes and re-deploy source code

625

620-1

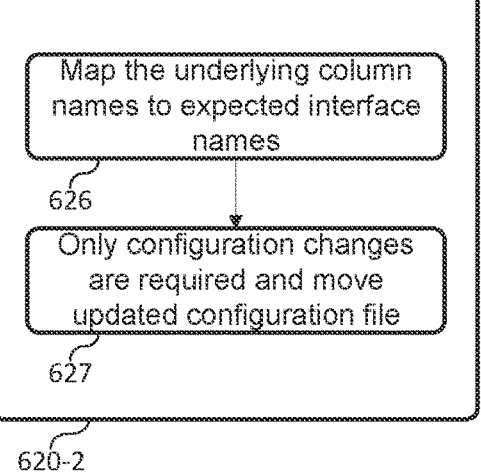

Map the underlying column names to expected interface names

626

Only configuration changes are required and move updated configuration file

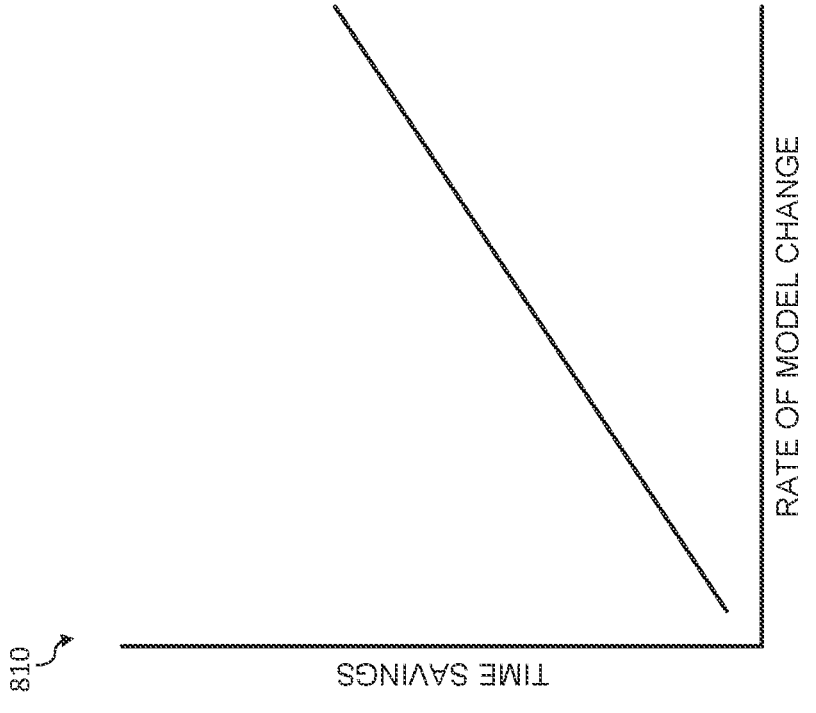
810
TIME SAVINGS
RATE OF MODEL CHANGE
FIG. 8
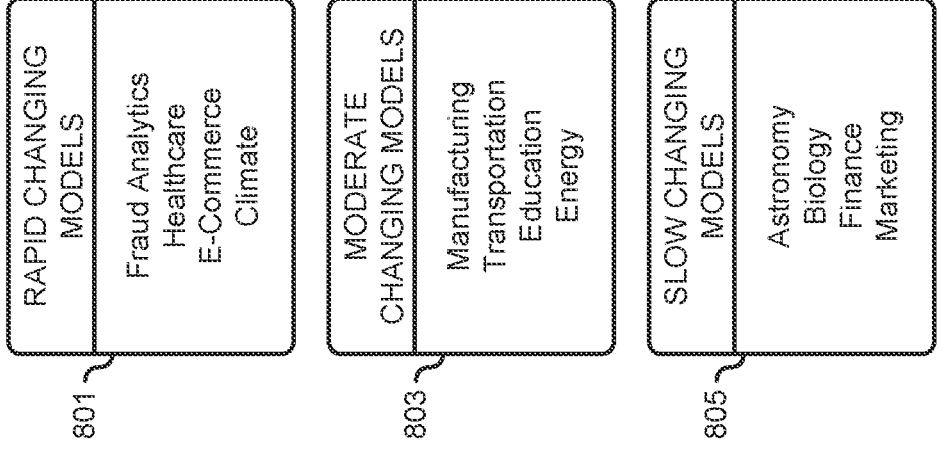
RAPID CHANGING MODELS
Fraud Analytics
Healthcare
E-Commerce
Climate
801
MODERATE CHANGING MODELS
Manufacturing
Transportation
Education
Energy
803
SLOW CHANGING MODELS
Astronomy
Biology
Finance
Marketing
805

900

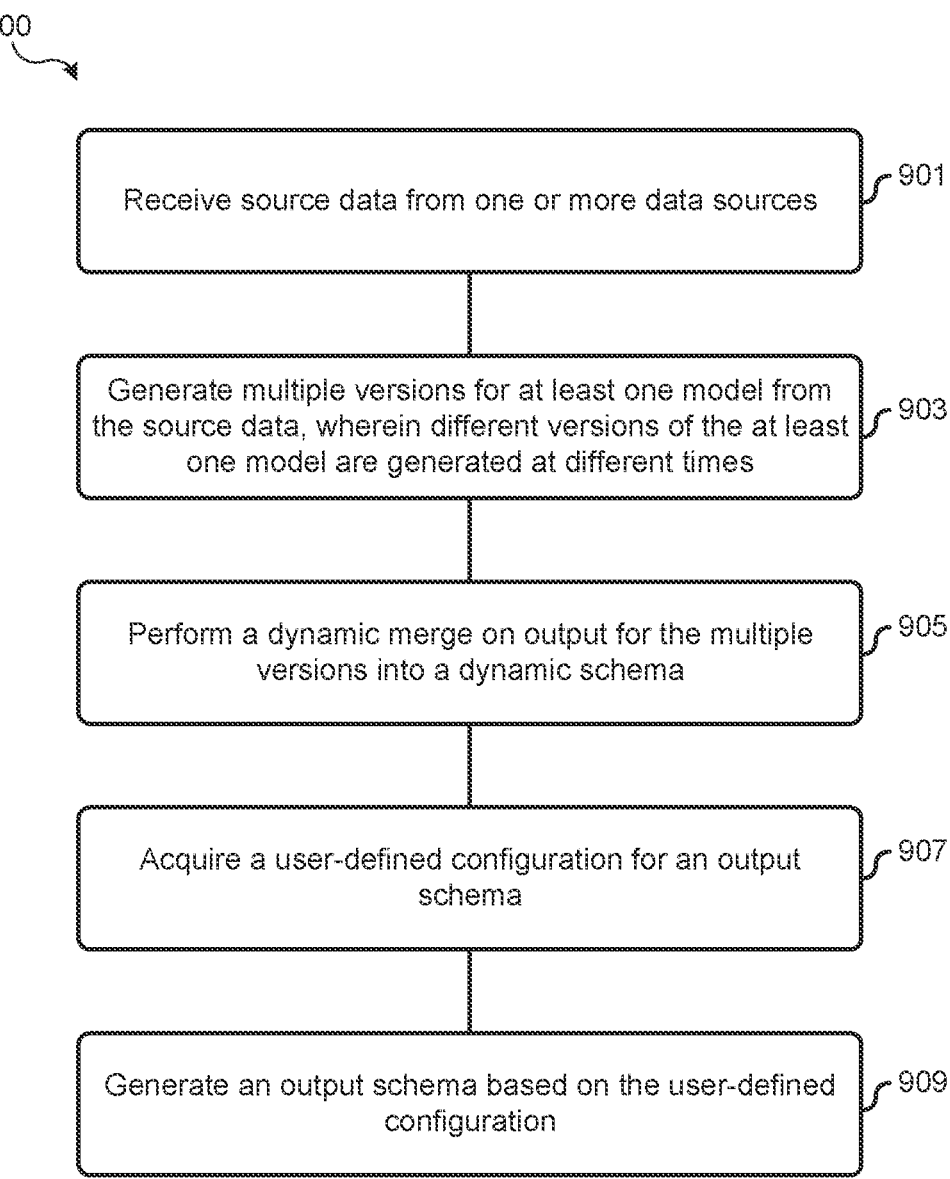

Receive source data from one or more data sources — 901

Generate multiple versions for at least one model from the source data, wherein different versions of the at least one model are generated at different times — 903

Perform a dynamic merge on output for the multiple versions into a dynamic schema — 905

Acquire a user-defined configuration for an output schema — 907

Generate an output schema based on the user-defined configuration — 909

FIG. 9

ZERO-CODE APPROACH FOR MODEL VERSION UPGRADES

BACKGROUND

In the field of data science, data analysis techniques are used to extract insights, knowledge, and actionable information from large data sets. As part of the data analysis techniques, data science models are developed, and their outputs are used by downstream applications to perform different functions, or the models can be used to report particular data from large data sets. The main goal of data science is to help organizations make better decisions, predict trends, and discover hidden patterns in data.

In the domain of fraud analytics and compliance checking, the techniques of data analysis can be used to produce models that can be used by downstream applications to investigate and/or confirm frauds or non-compliances. In these domains, data can be acquired from various data sources, and the data is then prepared for model training. When the data is prepared, it can be provided to various algorithms that generate models from the data. The models can then be deployed into production environments where the models produce data that can be used by downstream applications/processes for investigation, confirmation, prevention, and other actions related to fraud analysis and compliance. Further, models used in fraud analytics and compliance checking may often change in response to changes in the data used to produce the models.

SUMMARY

Systems and methods for a zero-code approach for model version upgrades is described herein. For example, a system includes memory for storing data. The system further includes at least one processor configured to execute computer-readable instructions that direct the at least one processor to receive source data from one or more data sources. The at least one processor is also configured to apply an ingestion process to the source data for storing storage data in a data storage repository. Further, the at least one processor is configured to generate one or more models from the data storage repository. Moreover, the at least one processor is configured to apply an output process to generate one or more output schemas based on the generated one or more models. Additionally, the at least one processor is configured to apply the one or more output schemas for providing data use in a downstream pipeline. Also, at least one of the source data and the one or more models changes over time leading to different data type collections. Further, at least one of applying the ingestion process and applying the output process comprises directing the at least one processor to perform a dynamic merge on the different data type collections to create a merged data type collection. Additionally, the at least one processor is directed to acquire a user-defined configuration for the merged data type collection. Moreover, the at least one processor is directed to generate an output schema to the merged data type collection based on the user-defined configuration.

BRIEF DESCRIPTION OF DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

FIGS. 5A-5C illustrate a flow chart diagram for a zero-code approach for model version upgrades according to an aspect of the present disclosure;

FIG. 6 illustrates multiple flow charts contrasting the typical model production and update methods against systems and methods described according to an aspect of the present disclosure;

FIG. 8 illustrates a table and graph showing the benefits of implementing a system for generating models according to an aspect of the present disclosure; and FIG. 9 illustrates a flow chart diagram for a zero-code approach for model version upgrades according to an aspect of the present disclosure.

Figure 1:
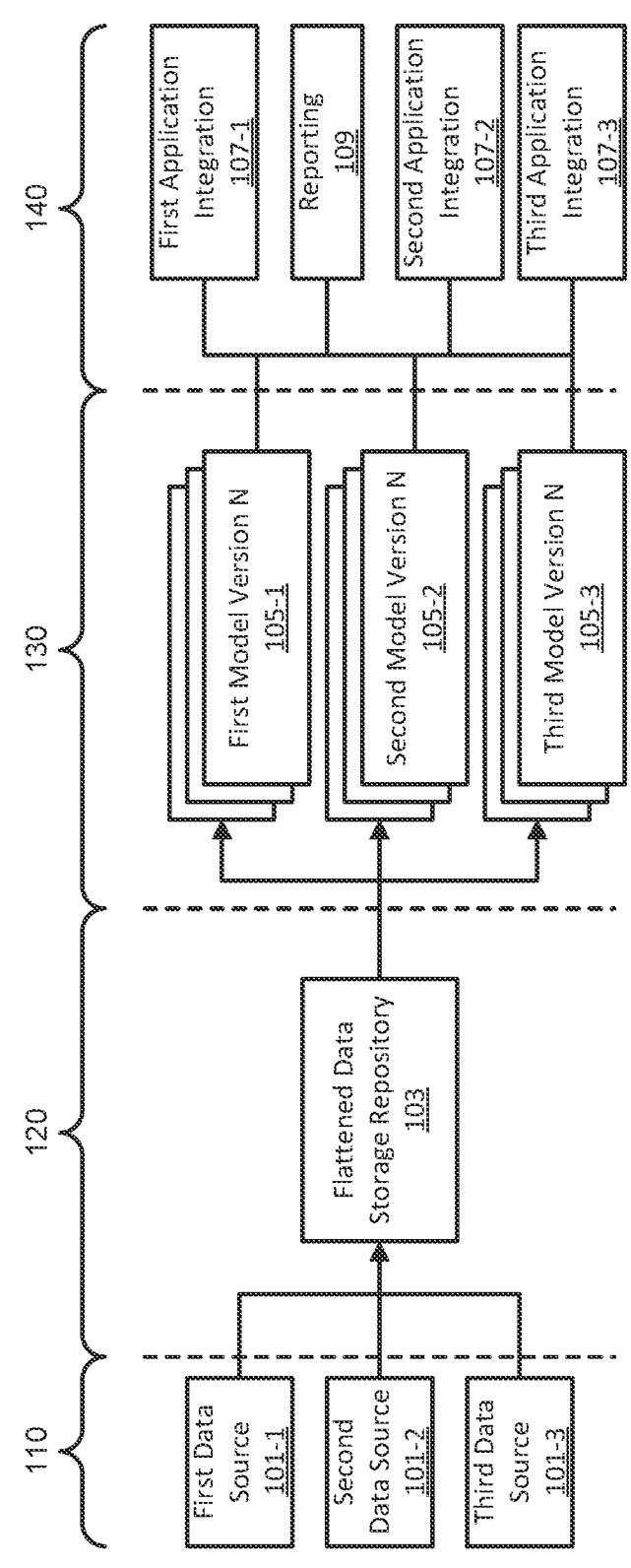
FIG. 1 is a block diagram of a typical system for generating models from a data set.

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific illustrative embodiments. However, it is to be understood that other embodiments may be used and that logical, mechanical, and electrical changes may be made.

The present disclosure describes systems and methods for a zero-code approach for providing model version upgrades into a downstream pipeline. In certain embodiments, a system provides a zero-code approach by receiving source data and applying an ingestion process to the received source data. The ingestion process prepares the received data for storage in a data storage repository. Additionally, algorithms executed by one or more processors may generate models from the stored data. Further, one or more processors may apply an output process that generates one or more schemas that can be applied to the data produced by the models for use in downstream pipelines.

As described herein, the ingestion process and the output process are able to accommodate changes in both the model output and the data from the sources while reducing the efforts of a user or technician when providing data that can be used in a downstream pipeline. Thus, the ingestion process and the output process described herein are particularly suitable for downstream applications that are susceptible to frequent changes in the data provided to the ingestion process and model outputs that change in response to the model outputs. Examples of such applications include fraud analytics and compliance checking.

Fraud analytics, as described herein, generally refers to the use of data analysis techniques to detect prevent and mitigate fraudulent activities. Frequently, large amounts of data are analyzed to identify patterns, anomalies, and trends that may indicate fraudulent behavior. To successfully commit fraud, fraudulent acting individuals are always trying new ways to commit fraud. Thus, the data provided for fraud analytics frequently changes to reflect the new ways that people try to commit fraud. The changes in data result in changes to the models and the resultant schema applied to the changes in the data produced by the models.

Compliance checking, as described herein, generally refers to processes that ensure that data processing, storage, and analysis adhere to established rules, regulations, and guidelines. As companies that fail to meet compliance requirements are subject to legal penalties, data analysis techniques are often employed to ensure that compliance requirements are met. However, some individuals or companies may seek new ways to avoid compliance, which may result in changes in the data provided for the generation of models and the resultant schema applied to the changes in the data produced by the models.

Accordingly, in fields of fraud analytics, compliance checking, and other fields that produce rapidly changing data sets, the changes in the provided data and the schemas can change the types of data that are potentially provided to downstream applications. As the downstream applications frequently are built to interface with data provided in a particular format, changes in the types of data provided to the downstream applications can potentially break the downstream applications. To avoid breaking downstream applications, technicians or other users often have to review the data provided to the model and the schemas produced by the model to ensure that the data provided to the downstream pipeline includes the data that is expected by the downstream applications. Ensuring that the provided data accords with the expectations of the downstream applications is a time-consuming endeavor, especially, when the data provided to the model generation changes often like the data provided in the fields of fraud analytics, compliance checking, and other similar fields.

FIG. 1 is a block diagram of a typical system 100 for generating models from a data set that produces information for use within a downstream pipeline. As illustrated, the components of the system 100 are implemented as different data sources or components that are associated with different stages of the process for generating models. For example, the system 100 includes components associated with the data collection 110, data preparation 120, modeling 130, and deployment 140.

As illustrated, the data collection 110 refers to the acquisition of relevant, raw data from various data sources 101. As illustrated, the system 100 includes a first data source 101-1, a second data source 101-2, and a third data source 101-3. While the data sources 101 are illustrated as individual data sources, herein, they are referred to generally or collectively as data source 101 or data sources 101. A data source 101 may be any source of computer-readable data. Accordingly, a data source 101 may include databases, application programming interfaces (APIs), web scrapers, user-generated content, real-time data streams, or other sources of data. The raw data from the data sources 101 may be gathered automatically or manually using web-scraping, data extraction, manual data entry, and other data acquisition tools or techniques. Often, the data gathered from the data sources 101 is a large and diverse range of data that can be used to produce a robust and versatile model that can adapt to different situations. Thus, the gathered data can be very large and difficult for a user to review without the aid of data modeling.

Further, when the system 100 gathers data from the relevant data sources 101, the data preparation 120 may then implement processes to prepare the raw data for modeling. During data preparation 120, the system 100 may perform multiple steps to prepare the data for modeling. For example, the system 100 may clean, transform, and integrate the data. When cleaning the data, the system 100 may identify and correct errors, inconsistencies, and missing values in the raw data. Further, the system 100 may perform techniques like outlier detections, data imputation, and data validation, among other techniques associated with data cleaning. When transforming the data, the system 100 may convert the cleaned data into a format suitable for modeling, which may include normalization, scaling, and encoding. When integrating the data, the system 100 may merge the data from the multiple data sources 101 into a single, consistent dataset to ensure that all relevant information is considered during modeling. Frequently, the dataset is flattened, whereby a multidimensional or hierarchical data structure is transformed into a simpler one or two-dimensional format. Flattening the data set linearizes the relationships and connections between the different data elements thus simplifying the processing of the data for model generation.

During data preparation 120, the data is stored within a flattened data storage repository 103. Frequently, the flattened data storage repository 103 may be a data lake, data warehouse, or combination thereof. As used herein, a data lake refers to a flattened data storage repository 103 on a data storage device or series of devices that store the raw data as collected from the data sources 101. As used herein, a data warehouse refers to a flattened data storage repository 103 on a data storage device or series of devices that stores structured data. As data lakes store raw data, schemas are applied when data is read from the data lake. Conversely, as data warehouses store structured data, schemas are applied when data is written to the data warehouse. As described above, the data collection 110 and data preparation 120 may be referred to as the ingestion pipeline or ingestion process.

Further, the system 100 includes a modeling stage 130. In modeling stage 130, a processor or series of processors execute an algorithm or series of algorithms based on a particular problem to be solved and the characteristics of the prepared data in the flattened data storage repository 103. Often the algorithms are machine learning algorithms that include supervised, unsupervised, or reinforcement learning approaches. The modeling stage 130 includes a training stage that uses the prepared data along with defined target variables and features. During the training stage, the model learns to identify patterns and relationships within the data. After creation, the model may be able to make predictions or decisions using new data based on the identified patterns and relationships. After training the model, modeling stage 130 may include a validation stage, during the validation stage, model performance is assessed. For example, the validation techniques, such as cross-validation, performance metrics, and confusion matrices, may be employed to assess the performance of the model and to fine-tune the parameters to achieve the desired level of accuracy and generalization.

As illustrated in the modeling stage, multiple different models 105 may be produced. For example, a first model 105-1, a second model 105-2, and a third model 105-3 may be produced. The models may be referred to individually and generally as models 105. Further, in rapidly changing environments, the models 105 may be generated repeatedly in response to changes to the data in the flattened data storage repository 103. When new models 105 are generated, the modeling stage 130 may produce different versions of the models 105. For example, the first model 105-1, second model 105-2, and third model 105-3 may have N versions. The different versions may provide data in different formats in response to the changes in the received data. Also, while each of the models 105 are illustrated as having N versions, the different models 105 produced in the modeling stage 130 may have differing numbers of versions.

Further, the system 100 may include a deployment stage 140. During the deployment stage, the output produced by the models 105 is introduced into a downstream pipeline. In the downstream pipeline, the models 105 produces output that can be used for processing or reported to other systems. Within the downstream pipeline, the model output can be transformed into more interpretable or usable formats. Further, the model output can be stored in other storage systems or integrated into other systems. For example, the output of a model 105 can be combined with other data sources or incorporated into larger applications. In one implementation, the outputs from different models can be combined with each other. For example, the output of the first model 105-1 can be combined with the output from the second model 105-2. In some embodiments, the output from a model 105 can be evaluated and monitored to ensure that the output from the model is accurate or relevant. Moreover, information can be collected from end users or other systems to improve the model's performance over time through a feedback loop.

As illustrated, in the deployment stage 140, the output from the models 105 are provided to application integrations 107. As illustrated, the output from models 105 can be provided to multiple application integrations 107. The application integrations are referred to herein generally or collectively as application integrations 107. However, the application integrations 107 are also referred to individually as first application integration 107-1, second application integration 107-2, and third application integration 107-3. Each application integration 107 may receive output from a single model 105 or a group of models 105. For example, the first model 105-1 may provide output to the first application integration 107-1, while the second model 105-2 and third model 105-3 may both provide output to the second application integration 107-2. Additionally, the output from the models 105 may be reported through a reporting function 109. The reporting function 109 may include information that could be analyzed by other systems to review data provided to the models or by the models. Also, the reporting function 109 can produce data that can be inserted into a feedback loop to improve the operation of the models.

Further, when the models 105 provides output, the deployment stage 140 may apply a schema to the model output to determine how the model output is delivered through the downstream pipeline. As used herein, a schema is a structured definition and organization of the outputs of a machine-learning model. Applying the schema to the model output provides a clear and consistent way of providing the model output through the downstream pipeline. As the schema enables a clear and consistent way of introducing data into the downstream pipeline, the downstream application integrations 107 and reporting function 109 may receive reliable outputs from the models 105 that enhance the execution of the application integrations 107.

However, in some applications of data science, like fraud analytics, compliance checking, and the like, the data provided through the ingestion pipeline may lead to changes in types of data provided by different versions of the models 105. In such implementations, if the schema for an earlier version is applied to the model output from a later version, the data introduced into the downstream pipeline may potentially break application integrations 107. To avoid potentially breaking the application integrations 107, a technician may edit the schema to ensure that the data introduced into the downstream pipeline is useable by the application integrations 107 and the reporting function 109. The editing of the schema may take a substantial amount of time so the model output is useable within the downstream pipeline. For data science applications having rapidly changing data sets, technicians often have to spend the time editing the schemas, leading to a substantial cost to maintain useable models.

Figure 2:
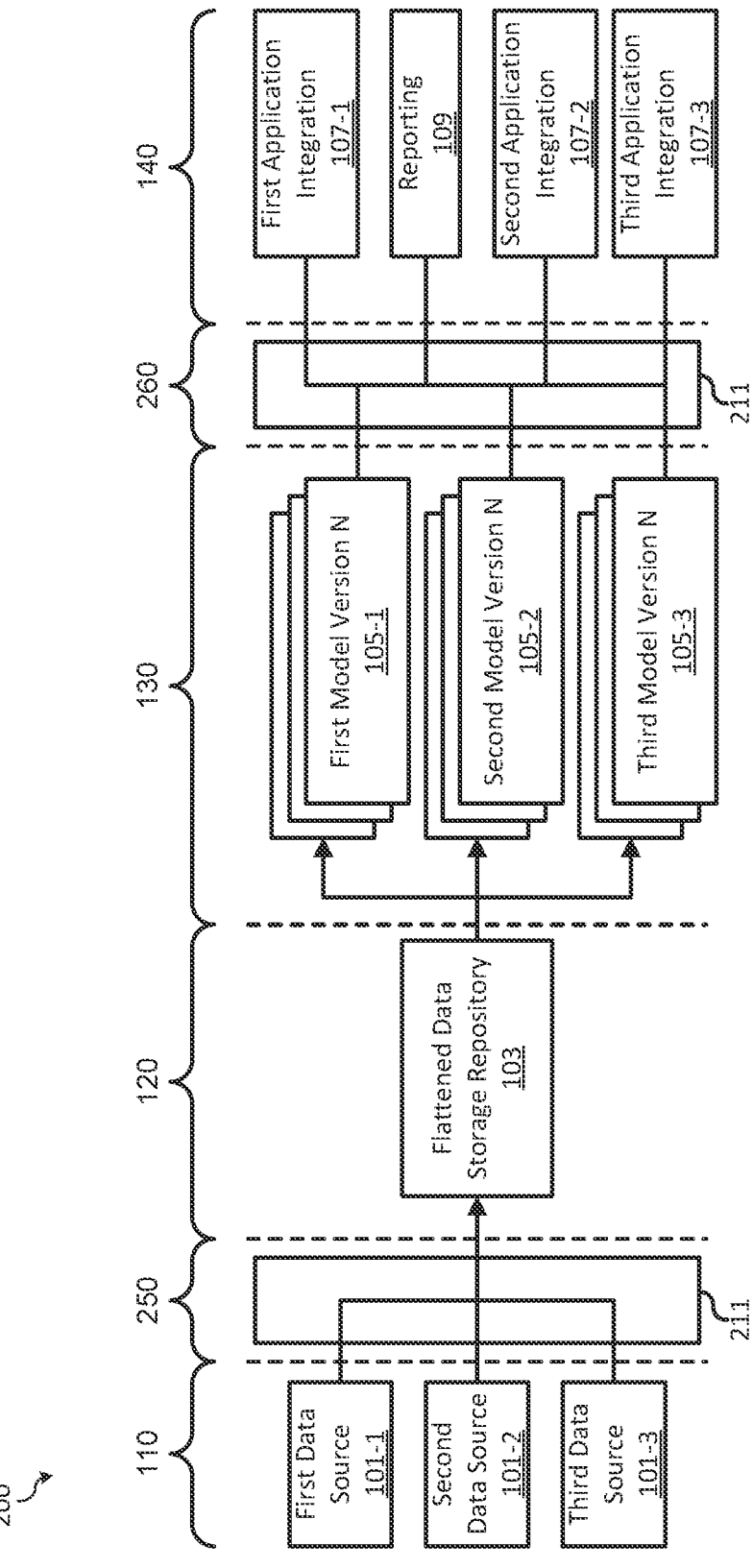
FIG. 2 is a block diagram of a system for generating models from a data set according to an aspect of the present disclosure.

FIG. 2 is a block diagram of a system 200 for generating models from a data set that produces information that implements a zero-code approach for providing model upgrades. As illustrated, the components of the system 200 are implemented as different data sources or components that are associated with different stages of the process for generating models. Thus, the system 200 includes similar components to the system 100 described above in FIG. 1. For example, the system 200 includes a data collection 110, a data preparation 120, a modelling stage 130, and a deployment stage 140, which function substantially as described above. However, the system 200 further includes an ingestion process 250 and an output process 260. As described herein the ingestion process 250 refers to a process for creating a schema to combine newly received data from the data sources 101 with previously received data stored in the flattened data storage repository 103. Additionally, the output process 260 refers to a process for creating a schema for combining the data types provided by a newly generated model with the data types provided by a previously generated model. While the system 200 is illustrated as including both an ingestion process 250 and an output process 260, the system 200 may include one of an ingestion process 250 or an output process 260.

In certain embodiments, an ingestion process 250 and an output process 260 may include a configuration driven dynamic schema evolution (CDDSE) 211. The CDDSE 211 includes a dynamic schema evolution that performs a dynamic merge of different data type collections to create a merged data type collection. Further, the CDDSE 211 includes a configuration driven transformation that acquires user-defined configurations. For example, a user may define a series of mappings for the data type collections in the merged data type collections. Additionally, the CDDSE 211 includes a dynamic schema on read. The dynamic schema on read generates an output schema for application to the merged data type collection using the user-defined configurations in the configuration driven transformation. Accordingly, an output schema provided to a particular application integration 107 will provide the expected data despite changes in the data provided by the models 105 or the data sources 101.

Figure 3:
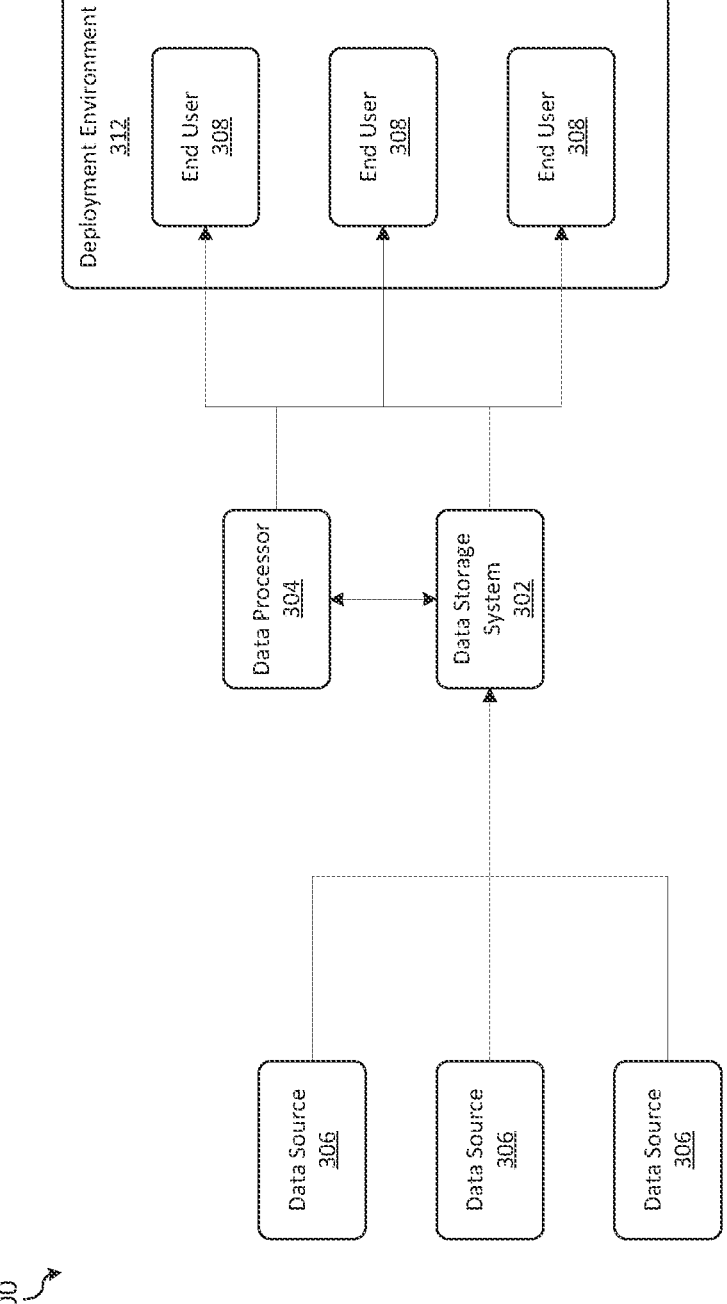
FIG. 3 is a block diagram of a network for generating models according to an aspect of the present disclosure.

FIG. 3 is a block diagram of a system 300 for generating model upgrades from a data set using a zero-code approach. As illustrated, the system 300 includes one or more data sources 306, a data storage system 302, a data processor 304, and one or more end users within a deployment environment 312. As shown, the data processor 304 generates one or more models from data stored on the data storage system 302 and provides the models to the deployment environment 312. After providing the models, the data processor 304 may generate upgraded models based on new data from the data sources 306 and provide the upgraded models to the deployment environment 312.

As shown, the data sources 306 may be any source of data that can be used by a data processor 304 when generating and updating models. In some implementations, the data sources 306 produce raw data that can be processed for consumption by the data processor 304. Alternatively, the data sources 306 may provide data that is ready for consumption by the data processor 304. The data sources 306 may include relational and non-relational databases, file systems, applications, devices, other model generation systems, data vendors, and data generated by the end users 308 using previously generated models.

In some implementations, the data processor 304 is able to use processed data to generate models, the processed data is raw data that has been analyzed and processed into formats that are useable by the data processor 304 for generating models. The data processor 304 may be a computation device implemented using software, firmware, hardware, or an appropriate combination thereof. The data processor 304 and other computational devices may be supplemented by, or incorporated in, specially-designed application-specific integrated circuits (ASICs) or field programmable gate arrays (FPGAs). The data processor 304 can also include or function with software programs, firmware, or other computer-readable instructions for carrying out various process tasks, calculations, and control functions used in the methods and systems described herein.

To generate the models, the data processor 304 may execute one or more model generation algorithms. The model generation algorithms may include one or more algorithms used to generate models from large data sets. The algorithms may include regression algorithms, neural network algorithms, clustering algorithms, association rule mining algorithms, dimensionality reduction algorithms, and the like. Further, the data processor 304 may execute the algorithms using cloud-based data processing systems, high-performance computing clusters, data science workstations, distributed data processing systems, and the like.

The model generation algorithms and other methods described herein executed by the data processor 304 and other computational devices may be implemented using computer-executable instructions or code, such as program modules or components. Generally, program modules include routines, programs, objects, data components, data structures, algorithms, and the like, which perform particular tasks or implement particular abstract data types. These program modules or components are typically stored on appropriate computer program products that include computer-readable media used to store computer-readable instructions or data structures. Such a computer-readable medium may be available media that can be accessed by a general-purpose or special-purpose computer or processor, or any programmable logic device.

Suitable computer-readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

In some implementations, the computer-readable storage media may include the data storage system 302. The data storage system 302 may store raw and processed data from the data sources 306. Also, the data storage system 302 may store generated models from the data processor 304. Examples of data storage system 302 may include databases, data lakes, data warehouses, distributed file systems, object storage, and the like. The models provided by the system 300 to the end users 308 in the deployment environment 312 may be provided by the data processor 304 or accessed from the data storage system 302.

Figure 4:
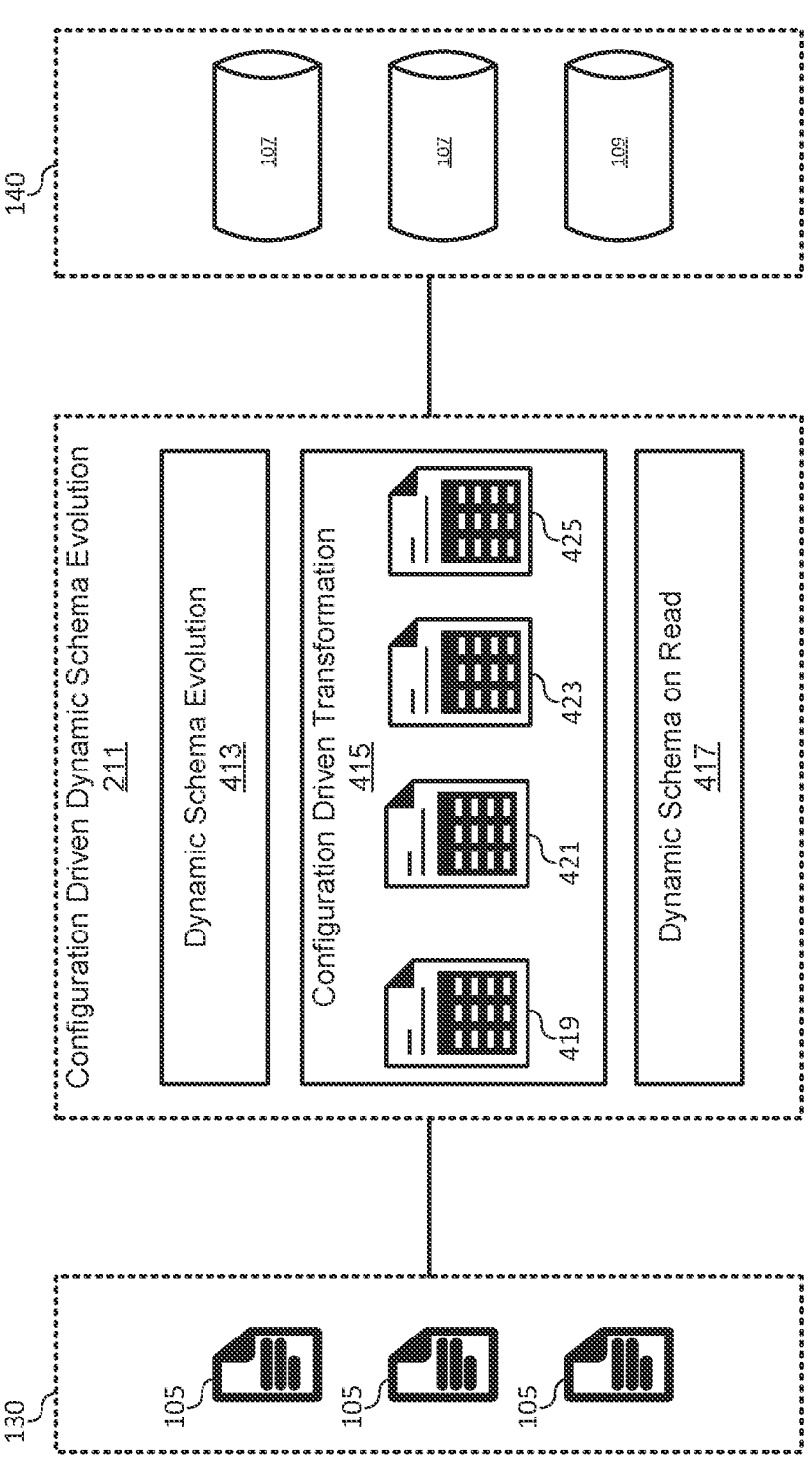
FIG. 4 is a block diagram illustrating the components of a configuration driven dynamic schema evolution according to an aspect of the present disclosure.

FIG. 4 is a block diagram illustrating the components of the CDDSE 211 in greater detail. As shown, the CDDSE 211 receives output from a modeling stage 130 that includes multiple models 105. Further, the CDDSE 211 provides data to the deployment stage 140 through the downstream pipeline that includes application integrations 107 and reporting functions 109. As illustrated, the CDDSE 211 includes a dynamic schema evolution 413, a configuration driven transformation 415, and a dynamic schema on read 417, which function in a similar manner as described above in relation to FIG. 2.

In certain embodiments, the dynamic schema evolution 413, as described above, performs a dynamic merge of different data type collections. For example, the output from the models may be saved in particular formats like Avro, Parquet, and Delta, which are file formats used for storing and processing large-scale data in big data systems. Avro is a row-based file format that uses a compact, binary data serialization format. It is designed to be language-independent, thus data written in one programming language can be read in another language. Parquet is a columnar storage file format that is designed to be highly efficient for processing large datasets, as it allows for parallel processing of individual columns and can compress data for better storage utilization. Delta is a transaction storage layer built on top of Parquet that is designed for building data lakes and data warehouses. Delta provides atomicity, consistency, isolation, and durability (ACID) transactions and versioning capabilities, that allow users to easily query and manage large datasets.

When the data produced by the data sources 101 is saved in the Delta format, data acquired from a data source 101 at different times or from different combinations of data sources 101 may be merged together using an automatic schema evolution to create a data table. For example, as the data from the data sources 101 is saved in the Delta format, the data may be saved in columns, if a column in the data from the data sources 101 is not available in the previously saved flattened table, a new column may be added to the table that is updated with the values in the data from the data sources 101. If the table includes columns not present in the data from the data sources 101, the column is kept in the table and previously saved values are left unchanged while values corresponding to new values in other columns found in the data from the data sources 101 are set to null. In some implementations, to use automatic schema evolution, a user may enable the automatic schema evolution.

In a similar manner, when the data produced by the models 105 is saved in the Delta format, data from different versions of a model 105 may be merged together using the automatic schema evolution. For example, the data from the data sources 101 may be saved in columns in a schema, if a column in the data produced by the most recent model version is not available in a schema based on data produced by the previous model version, a new column may be added to the schema that is updated with the values in the data from the newer model version. If the schema includes columns not present in the data from the most recent model version, the column is kept in the schema and previously saved values are left unchanged while values corresponding to new values in the data from the most recent model version are set to null. Likewise, a user may enable the automatic schema evolution.

In certain embodiments, when the dynamic schema evolution has saved the data from the data sources 101 or the models in various tables, the CDDSE 211 may perform the configuration driven transformation 415. In the configuration driven transformation, a system may use the user-provided configuration files to combine the various tables. For example, the user-provided configuration files may include a source metadata file 419. Further, the user-provided configuration files may include a join metadata file 421 and a mapping metadata file 423. Additionally, the user-provided configuration files may include a filter metadata file 425.

When the CDDSE 211 is part of the output process 260, a user may write the source metadata file 419 to define the sources available when creating a schema for use with the deployment stage 140. The source metadata file 419 may identify the locations of the tables and database names for the various sources. The sources may include outputs for the models 105, data enrichment tables, standardizations, and the like. Further, the source metadata file 419 may define logical names for the various sources when combining the data and for use in downstream pipelines. When the sources are defined in the source metadata file 419, a user may define a join metadata file 421 to define different possibilities for how to join the data in the tables defined in the source metadata file 419. Further, the join metadata defines various join types. When the join types are defined within the join metadata file 421, a user may also define a mapping metadata file 423. The mapping metadata file 423 may define lenses through which the data identified in the join types can be viewed by an application integration 107 or a reporting function 109 through any subsequent schemas. In some implementations, a user may define a filter metadata file 425, which defines which rows within a column are available through a particular lens defined in the mapping metadata file 423.

When the CDDSE 211 is part of the ingestion process 250, a user may write the source metadata file 419 to define the tables available from the different data sources 101. The source metadata file 419 may identify the locations of the tables and database names for the various tables from the data sources 101. The ingestion process 250 may use the source metadata file 419 to identify the sources to be saved in the flattened data storage repository 103. In some implementations, when an external user desires to view the data within the flattened data storage repository 103, a user may further define a join metadata file 421 to define different possibilities for how to join the data in the tables defined in the source metadata file 419. Further, the join metadata defines various join types. When the join types are defined within the join metadata file 421, a user may also define a mapping metadata file 423. The mapping metadata file 423 may define lenses through which the data identified in the join types, stored in the flattened data storage repository 103, can be viewed by a user or external application. Additionally, a user may define a filter metadata file 425, which defines which rows within a column are available through a particular lens defined in the mapping metadata file 423.

Further, when the files for the configuration driven transformation 415 are defined by a user, the CDDSE 211 can perform a dynamic schema on read 417. When the CDDSE 211 is part of the 260, the dynamic schema on read 417 generates multiple schemas associated with the lenses defined in the mapping metadata file 419. The generated schemas are then provided to associated application integrations 107 or for a reporting function 109. When the CDDSE 211 is part of the 250, the dynamic schema on read 417 generates a schema for the data to store in the flattened data storage repository 103.

By implementing the CDDSE 211 within the process illustrated in FIG. 2, a model generation system is able to provide schemas for deployment with limited user interaction. In particular, by performing the dynamic schema evolution 413 of generated model output from different model versions and data provided from different data sources, the CDDSE 211 improves the speed at which models 105 can be deployed. As the speed of deployment is increased, generated models 105 are able to be more responsive to changes in the data sources 101.

Figure 5A:
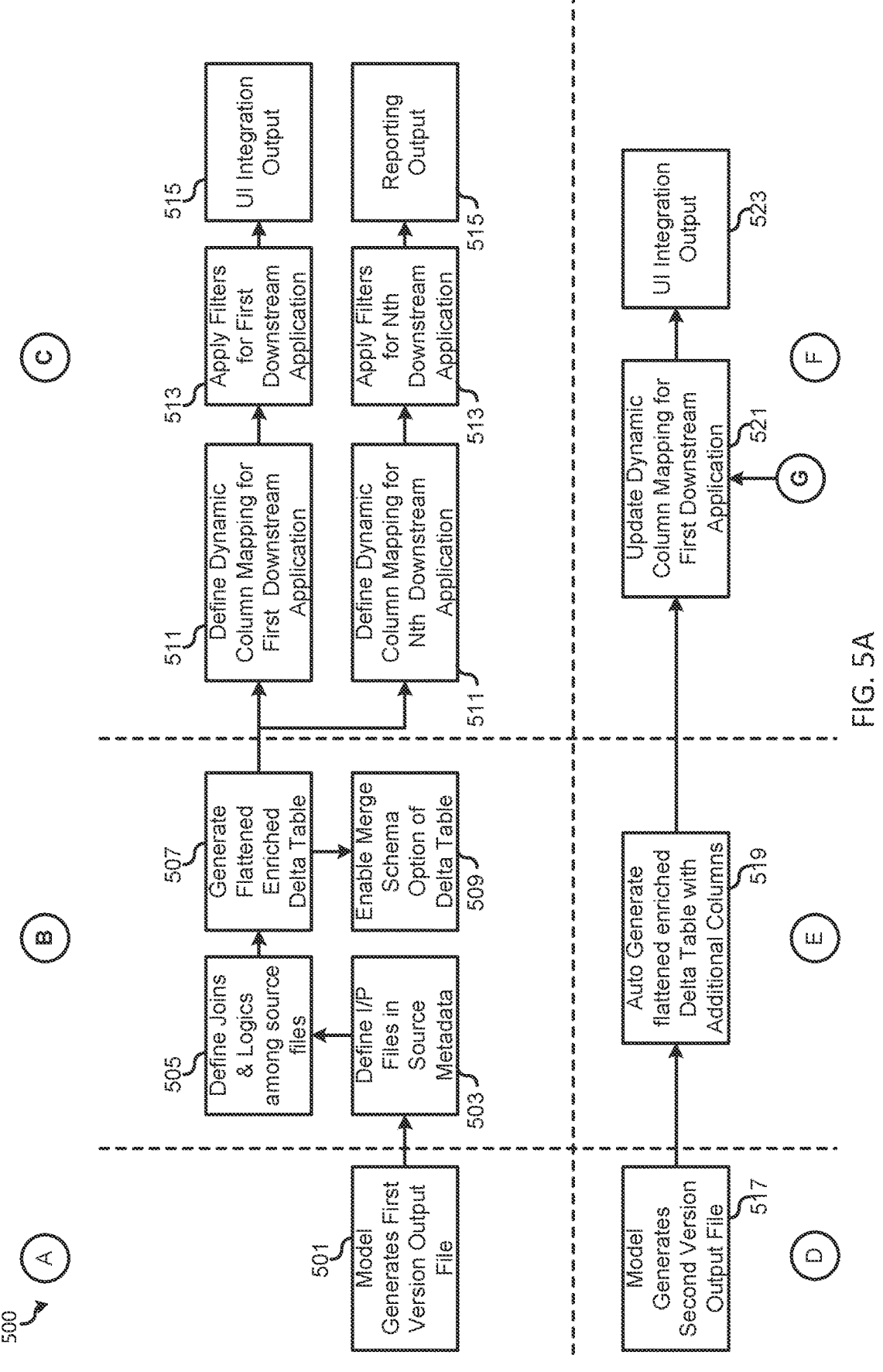

FIGS. 5A and 5B respectively show a flowchart diagram of a method 500 for zero-code approach for model version upgrades and exemplary tables associated with different states of the method 500. As shown, the method 500 proceeds at 501, where a model generates a first version output file. The first version output file 531 may be illustrated in FIG. 5B. As shown, the first version output file 531 is a table having five columns and two rows, where each entry in the table has data stored therein.

In further embodiments, the method 500 proceeds at 503, wherein input files are defined in source metadata. When the source metadata is defined, the method 500 proceeds at 506, where the joins and logics are defined for the source files identified in the source metadata. For example, a user may define source, and join metadata files as described above with regards to the configuration driven transformation 315 in FIG. 3. When the metadata files are created, the method 500 proceeds at 507, where a flattened enriched Delta table is generated. Further, the method 500 proceeds at 509 where a merge schema option is enabled for the enriched Delta table. An exemplary flattened enriched Delta table 533 is illustrated in FIG. 5B. As shown, the flattened enriched Delta table 533 includes seven columns and two rows, where two columns include enriched data.

In additional embodiments, the method 500 may split into N output streams, where each output stream is provided into different pipelines. For example, the method 500 may proceed at 511, where a dynamic column mapping is defined for one of N downstream applications. Further, the method 500 may proceed at 513, where filters are applied for one of the N downstream applications. After the filters are applied, the method 500 may proceed at 511, where a schema is applied to the enriched Delta table for providing data to a user interface integration output. The output may be provided to an application integration or for reporting output. An exemplary output table 535 is illustrated in FIG. 5B. As shown, the exemplary output table 535 includes five columns and two rows that form a subset of the columns found in the exemplary flattened enriched Delta table 533, where the particular columns are indicated within the mapping metadata files.

In certain embodiments, at some later moment after generating a model and providing the output for reporting and integration, the method 500 proceeds at 517, where a model generates a second version output file. The second version output file may include different data from the first version output file. For example, the second version output file 537 is illustrated in FIG. 5B. As shown, the second version output file 537 is a table including five columns and four rows, where two rows include data not found in the first version output file 531. Further, the row C6 is a new row, thus, as row C6 did not exist for the first two rows, the first two rows of C6 are set to null. Further, the second version output file 537 also differs from the first version output file 531 in that the second version output file 537 does not include column C2.

In some embodiments, the method 500 proceeds at 519, where a flattened enriched Delta table is auto-generated with additional columns. The Delta table with additional columns 539 is illustrated in FIG. 5B. As shown, the Delta table with additional columns 539 is a table having eight columns and four rows, where the data found in the first version output file 531 and the exemplary output table 535 are merged together along with enrichment data. As the second version output file 537 lacks column C2, the last two entries in column C2 are set to null. As column C6 is new, the first two entries in column C6 are set to null.

In additional embodiments, the method 500 proceeds at 521, where the dynamic column mapping for a downstream application is updated. For example, a user may update the files associated with the configuration driven transformation for mapping the columns for use by a downstream application. Exemplary mappings defined in the source metadata file 419, join metadata file 421, mapping metadata file 423, and filter metadata file 425 are in shown in FIG. 5C. The method 500 then proceeds at 523, where the output is provided to a UI integration. An exemplary output table 541 is illustrated in FIG. 5B. As shown, the mapping metadata file maps a group of columns in the Delta table with additional columns 539 for provision as the exemplary output table 541 to the UI integration. As illustrated, the mapping metadata file maps columns C1, C3, C5, E1, and C6 in the Delta table with additional columns 539 for inclusion in the exemplary output table 541.

As stated above, FIG. 5C illustrates exemplary mappings for the data in the additional columns 539 for producing an exemplary output table 541 shown in FIG. 5B. As shown, FIG. 5C illustrates examples of a source metadata file 419, a join metadata file 421, a mapping metadata file 423, and a filter metadata file 425 that map the data in the additional columns 539 for producing an output table 541 for use by a downstream application or for reporting.

As shown, the exemplary source metadata file 419 includes multiple columns that identifies the sources of data to be mapped. For example, the columns of the source metadata file 419 include a model_name column, a format column, a database_name column, a table_name column, a location column, and a model_version column. The model-_name column may define names for the generated models. For example, the source metadata file 419 identifies models having the names M1 and A1. Also, the format column defines the format of the data generated by the models. For example, the source metadata file 419 may specify that the models produce data in the delta format. Moreover, the database_name column defines the name of the database that stores the model-generated data. For example, the model-generated data may be stored in the database DB1. Further, the table_name column may define the table names for the model-generated data. For example, the source metadata file 419 specifies table names as M1_Table and A1_Table. Additionally, the source metadata file 419 may specify the path locations of the model-generated data in a location column. For example, some of the model-generated data may be stored at the location abfss:\xxx\M1_Table or abfss:\\xxx\A1_Table. Also, the source metadata file 419 may specify the different versions of the generated models in the model_version column. For example, the source metadata file 419 may specify that the model M1 has two versions (V1 and V2), and the model A1 may only have a single model.

In some embodiments, the join metadata file 421 includes multiple columns that identifies the manner for joining the columns in the sources to the different data type collections. For example, the columns of the join metadata file 421 may include a model_name column, a model_version column, a join_type column, a table_name column, a join_columns column, and a columns_list column. The model_name column may define names for the generated models. For example, the join metadata file 421 identifies models having the names M1 and A1. Also, the model_version column may define the versions of the generated models. For example, the join metadata file 421 may specify that the model M1 has two versions (V1 and V2), and the model A1 may only have a single model. Additionally, the join-type column may define the method used to combine different tables based on a common column. For example, the join metadata file 421 may specify that the different models are joined using left joins. Moreover, the table_name column may define the table names for the model-generated data, For example, the join metadata file 421 specifies table names as M1_Table and A1_Table. Further, the join_columns may specify which columns are joined for a particular model. For example, the columns C1 and C3 are joined for the model M1, and the columns E3 and E4 are joined for the model A1. Additionally, the columns_list column may specify a list of columns that are associated with a particular model.

In further embodiments, the mapping metadata file 423 includes multiple columns that define how to map the data type collections into an output table, such as the exemplary output table 541. For example, the columns of the mapping metadata file 423 may include a model_name column, a model_version column, a source_table_name column, a source_column_name column, and a target_column_name column. The model_name column and model_version column are similar to the columns having similar names in the source metadata file 419 and join metadata file 421. Also, the source_table_name column specifies the source of a table name. Additionally, the source_column_name column specifies the name of a source column in the source files, and the target_column_name column specifies the name of a target column in the output file.

In additional embodiments, the filter metadata file 425 includes multiple columns that define what data will be viewable within the columns of an output model. For example, the columns of the filter metadata file 425 may include a model_name column, a model_version column, a column_name column, a condition column, and a value name. The model_name column and model_version column are similar to the columns having similar names in the source metadata file 419 and join metadata file 421. Further, the column_name column specifies a column that is filtered. For example, the column_name column specifies that the filters apply to columns C1, C2, and E1. Additionally, the condition column specifies the comparison condition for the data in the column against a comparative value specified in the value column. For example, the condition column and the value column may verify that each value of the column of C1 added to the output model is not null.

FIG. 6 illustrates contrasting methods for generating models to illustrate the benefits of the systems and methods described herein. In particular, FIG. 6 illustrates model initialization methods 610 and model update methods 620. In particular, FIG. 6 illustrates a typical model initialization method 610-1 and a model initialization method 610-2 as described herein. Further, FIG. 6 illustrates a typical model update method 620-1 and a model update method 620-2 as described herein.

The typical model initialization method 610-1 proceeds at 611, where columns are identified, and a schema is defined. For example, a user may analyze the data to identify the data columns and define a schema for presenting the columns of data for model generation. Further, the typical model initialization method 610-1 proceeds at 612, where source code is written to ingest the model data. For example, a user may write source code for using the data presented by the schema. Additionally, the typical model initialization method 610-1 proceeds at 613, where source code is written to do interface mapping. For example, a user may write source code that maps the data generated from the models to interfaces defined in downstream pipeline applications and reports.

After model generation, the models may be updated in response to newly acquired data. The typical model update method 620-1 proceeds at 621, where the deleted and newly added columns are identified. For example, as the models receive new data, the models may produce new data having different columns associated with different data types from the initially generated columns. Thus, a user may analyze the data from the previously generated models and from the newly generated models to identify what columns/data types from the previously generated models are not found in the newly generated models and the columns/data types in the newly generated models that are not found in the previously generated models. Further, the typical model update method 620-1 proceeds at 622, where scripts are written to update a schema definition with the latest changes. For example, a user may write scripts that change the schemas to reflect the changes in the data generated by the updated models.

Further, the typical model update method 620-1 proceeds at 623, where scripts/source code is written to populate data. For example, scripts are written to populate the schema with data generated by the models. Additionally, the typical model update method 620-1 proceeds at 624, where the source code is changed to map columns to an interface name. For example, to prevent the generated data from breaking downstream applications, a user may write code that maps the columns in the generated data to different interfaces associated with downstream applications. Moreover, the typical model update method 620-1 proceeds at 625, where the source code is built after the changes and the source code is redeployed. For example, the source code written by the user is built and deployed for application to the data produced by the newly generated data. As the typical method calls for a user to write scripts and source code to facilitate deployment, the deployment may take a significant amount of time and effort.

In certain embodiments, the initial generation of the model and subsequent updating of the model is performed as described herein to enable the deployment of the models in significantly less time than in typical model generation systems. For example, the model initialization method 610-2 proceeds at 614, where columns are identified, and a schema is defined. For example, a user may analyze the data to identify the data columns and define the schema that controls how the data will be presented for model generation. Further, the model initialization method 610-2 proceeds at 615, where a framework is imported to ingest the model data. For example, a framework for data ingestion is selected and imported for ingesting the model data presented by a schema. Additionally, the model initialization method 610-2 proceeds at 616, where configuration files are updated with interface column names. For example, a user may update configuration files as described herein, where the configuration files direct the mapping of data that includes the model output to interfaces defined in downstream pipeline applications and reports.

In further embodiments, the method 620-2 illustrates the steps performed by a user to interface the model output for deployment. In particular, the model update method 620-1 may proceed at 626, where underlying column names are mapped to expected interface names. For example, a user may revise configuration files that include source metadata files, join metadata files, mapping metadata files, filter metadata files, and the like. Using the defined files, a system may generate a dynamic schema on read. Further, the method 620-2 may proceed at 627, where the updated configuration files are moved to a desired location. When the updated configuration files are moved to a desired location, the system may use the files to generate the dynamic schema on read. As the user does not need to update the code and scripts for deployment, generated models can be deployed in significantly less time.

Figure 7:
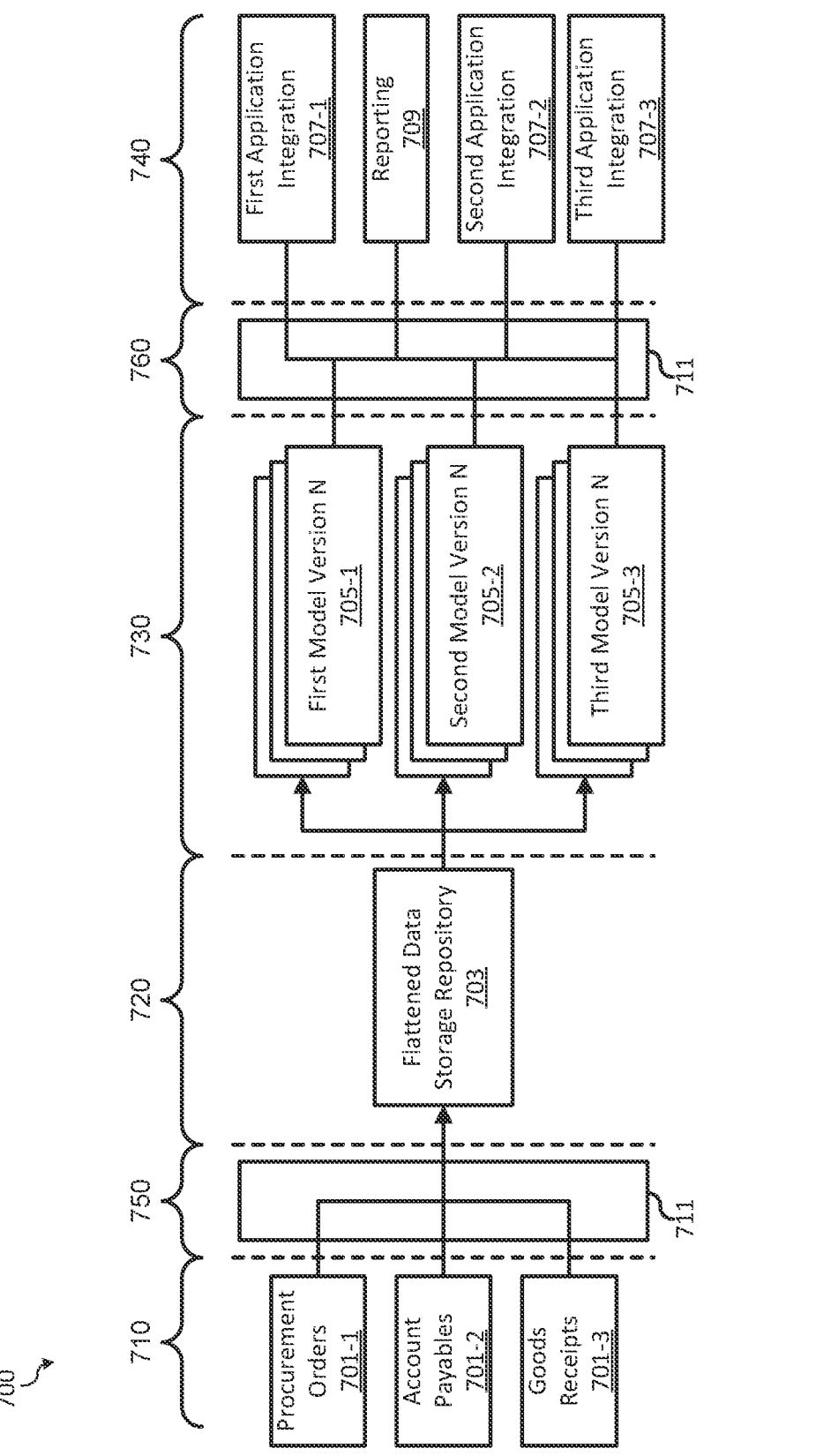
FIG. 7 illustrates a block diagram of a system for generating fraud analytics and compliance models according to an aspect of the present disclosure.

FIG. 7 is a block diagram of a system 700 for generating fraud analytics and compliance models from a data set that produces information for use within a downstream pipeline. As illustrated, the components of the system 700 are similar to the components described above in FIGS. 2 and 4. For example, the system 700 includes components associated with the data collection 710, data preparation 720, modeling 730, deployment 740, ingestion process 750, and output process 760, which function in similar manners to data collection 110, data preparation 120, modeling stage 130, deployment stage 140, ingestion process 250, and output process 260 described above.

As illustrated, the data collection 710 refers to the acquisition of relevant, raw data from various data sources 701 that provide information related to fraud analytics and compliance. For example, the various data sources 701 may include transaction data, customer data, audit data, network data, behavioral data, and the like. As illustrated, the data sources 701 show three potential sources of data when generating models that produce data that can help investigate or confirm fraud and non-compliance. For example, the data sources 701 may include procurement orders 701-1, account payables 701-2, and goods receipts 701-3.

The procurement orders 701-1 may refer to a record of one or more purchase orders that are commercial documents used to formally request goods or services from suppliers. The procurement order 701-1 may include information that describes names of individuals, individual contact information, order numbers, descriptions of goods and services, delivery dates, prices, quantity, terms and conditions for an order, and the like.

The accounts payable 701-2 may refer to records of money a particular company owes to a goods or services supplier for received goods or services. Accounts payable often arise when goods or services are purchased using credit or extended payment terms. The 702-2 may include information that describes invoice information, payment information, amount due, identification information, receipt information, aging information, and the like.

The goods receipts 701-3 may refer to documents that are used to confirm the receipt of goods or services from a supplier. A goods receipt is typically created when a party receives physical goods or services from a supplier. The goods receipts 701-3 may include information that describes receipt information, dates, supplier information, order information, detailed descriptions of the goods and services, conditions of the goods, and receiver information.

In certain embodiments, the data collection 710 aggregates raw information from the various data sources 701. The 710 may aggregate the raw data from the data sources 101 either automatically or manually using web-scraping, data extraction, manual data entry, and other data acquisition tools or techniques. The raw data may be provided to the ingestion process 750 for use in the generation of the models.

In certain embodiments, during the ingestion process 750, the system 700 may prepare the raw data as an input for model generation. In a similar manner as described above in connection with ingestion process 250, the ingestion process 750 may include a CDDSE 711, which is similar to the CDDSE 211 described above. As such, the ingestion process 750 implements a CDDSE 711 that includes a dynamic schema evolution that performs a dynamic merge of the data from the different data sources 701 into a merged data type collection. Further, the CDDSE 711 uses user-defined configurations to transform the data for use in model generations.

In some implementations, when the CDDSE 711 is part of the ingestion process 750, a user may write a source metadata configuration file to define various tables available from the different data sources 701 associated with fraud analytics and compliance. The source metadata file may identify the locations of the tables and database names for the information acquired from the data sources 701. For example, the source metadata file may identify the location of the data associated with the procurement orders 701-1, the account payables 701-2, and the goods receipts 701-3 among other potential sources of related data. The ingestion process 750 may use the source metadata file to identify the data from the data sources 701 to be saved in the flattened data storage repository 703.

In some implementations, when an external user desires to view or an external application desires to process the fraud analytics and compliance data within the flattened data storage repository 703, a user may further define a join metadata file to define different possibilities for how to join the data in the tables defined in the source metadata file. Further, the join metadata defines various join types. When the join types are defined within the join metadata file, a user may also define a mapping metadata file. The mapping metadata file may define lenses through which the fraud analytics and compliance data identified in the join types, stored in the flattened data storage repository 703 can be viewed by a user or external application. Additionally, a user may define a filter metadata file, which defines which rows within a column are available through a particular lens defined in the mapping metadata file. Further, the CDDSE 711 can use the user-defined configurations to perform a dynamic schema on read, which generates a schema for the data to be stored in the flattened data storage repository 703.

Further, when the system 700 gathers the data from the relevant data sources 701 of fraud analytic and compliance data, the data preparation 720 may then prepare the data identified in the schema generated by the CDDSE 711 data for modeling. During data preparation 720, the system 700 may clean, transform, and integrate the data. As described herein, the data may be flattened for storage in the flattened data storage repository 703, whereby a multidimensional or hierarchical data structure is transformed into a simpler one or two-dimensional format. As stated above, flattening the data set linearizes the relationships and connections between the different data elements thus simplifying the processing of the data when generating the models. The flattened data storage repository 703 may be a data lake, data warehouse, or combination thereof. As described above, the combination of the data collection 710, ingestion process 750, and data preparation 720 may be referred to as the ingestion pipeline for the model.

Further, the system 700 includes a modelling stage 730. In the modeling stage 730, a processor or series of processors execute an algorithm or series of algorithms based on a particular problem to be solved and the characteristics of the prepared data in the flattened data storage repository 703. Often the algorithms are machine learning algorithms that include supervised, unsupervised, or reinforcement learning approaches. The Modeling stage 730 includes a training stage that uses the prepared data along with defined target variables and features. During the training stage, the model learns to identify patterns and relationships within the fraud analytics and compliance data. After creation, the model may be able to produce data that can help make predictions or decisions using new data based on the identified patterns and relationships. After training the model, the modeling stage 730 may include a validation stage, during the validation stage, model performance is assessed. For example, validation techniques, such as cross-validation, performance metrics, and confusion matrices, may be employed to assess the performance of the model and to fine-tune the parameters to achieve the desired level of accuracy and generalization.

As illustrated in the modeling stage, multiple different models 705 may be produced. Further, in the fraud analytics and compliance environment, the data used to generate the models 705 may change frequently as the models 705 are regenerated in response to changes to the data in the flattened data storage repository 703. As the data changes, new versions of the models 705 are generated. The different versions may provide new data outputs and data in different formats in response to the changes in the received data.

In certain embodiments, the output process 760 may also include a CDDSE 711. The CDDSE 711 includes a dynamic schema evolution that performs a dynamic merge of different data type collections to create a merged data type collection. Further, the CDDSE 711 includes a configuration driven transformation that acquires user-defined configurations. For example, a user may define a series of mappings for the data type collections in the merged data type collections. Additionally, the CDDSE 711 includes a dynamic schema on read. The dynamic schema on read generates an output schema for application to the merged data type collection using the user-defined configurations in the configuration driven transformation. Accordingly, an output schema provided to a particular application integration 707 will provide the expected data despite changes in the data provided by the models 705 or the data sources 701.

When the CDDSE 711 is part of the output process 760, the CDDSE 711 receives output from a modelling stage 730 that includes multiple models 705, the CDDSE 711 may include a dynamic schema evolution, a configuration driven transformation, and dynamic schema on read which are similar to the dynamic schema evolution 413, a configuration driven transformation 415, and a dynamic schema on read 417 described above in FIG. 4.

As described above, the dynamic schema evolution performs a dynamic merge of different data type collections. For example, the output from the models may be saved in particular formats like Avro, Parquet, and Delta, which are file formats used for storing and processing large-scale data in big data systems. When the data produced by the data sources 701 is saved in the Delta format, data acquired from a data source 701 at different times or from different combinations of data sources 701 may be merged together using an automatic schema evolution to create a data table. For example, as the data from the data sources 701 is saved in the Delta format, the data may be saved in columns, if a column in the data from the data sources 701 is not available in the previously saved flattened table, a new column may be added to the table that is updated with the values in the data from the data sources 701. If the table includes columns not present in the data from the data sources 701, the column is kept in the table and previously saved values are left unchanged while values corresponding to new values in other columns found in the data from the data sources 701 are set to null. In some implementations, to use automatic schema evolution, a user may enable the automatic schema evolution.

In certain embodiments, when the dynamic schema evolution has saved the data from the fraud analytics and compliance models in various tables, the CDDSE 711 may perform a configuration driven transformation where user-provided configuration files are used to combine the data from the generated tables through the dynamic schema on read. For example, when part of the output process, the user-provided configuration files include a source metadata file, a join metadata file, and a mapping metadata file. Additionally, the user-provided configuration files may include a filter metadata file. Within the output process 760, a user may write the source metadata file to define the sources available when creating a schema for use with the deployment stage 740. For example, the source metadata file may identify the locations of the tables and database names for the various sources and define logical names for the various sources when combining the data for use in downstream pipelines. When the sources are defined in the source metadata file, a user defines the join metadata file to define different possibilities for joining the data in the tables defined in the source metadata file. Further, the join metadata defines various join types. A user may also define a mapping metadata file. The mapping metadata file may define lenses through which the data identified in the join types can be viewed by an application integration 707 or a report 709 through any subsequent schemas. In some implementations, a user may define a filter metadata file, which defines which rows within a column are available through a particular lens defined in the mapping metadata file.

Additionally, the CDDSE 711 includes a dynamic schema on read. The dynamic schema on read generates an output schema for application to the merged data type collection using the user-defined configurations in the configuration driven transformation. Accordingly, an output schema provided to a particular application integration 707 will be provide the expected data despite changes in the data provided by the models 705 or the data sources 701. Accordingly, the application integrations 707 may use the data produced by the models 705 to detect fraud and ensure compliance.

FIG. 8 illustrates a table and graph showing the benefits of implementing a system for generating models as described above. Data science models are applicable to many different fields to help make accurate predictions. For example, the systems and methods described herein have been described with respect to fraud analytics and compliance, but the subject matter is broadly applicable to many different data science fields. In particular, the systems and methods described herein are particularly applicable to data science models that rapidly change. Additionally, the systems and methods may also find applicability to moderate changing models. It is also possible that the systems and methods may also find applicability to slowly changing models. FIG. 8 illustrates various examples of rapidly changing models 801, moderately changing models 803, and slowly changing models 805.

Examples of fields that might produce rapidly changing models 801 include such fields as fraud analytics, healthcare, E-commerce, climate, etc. In these fields, the training data may change frequently, leading to changes in the resultant data models. For example, returning to FIG. 7, an initial data model may be produced on data from the procurement orders 701-1 that has 20 columns. After the passage of time, the data from the 701-1 may include additional columns with some or all of the initial 20 columns. The generation of this data may result in additional columns to be mapped in the output of the model. The systems and methods described herein may aid in streamlining the deployment of the newly generated models. As the data models rapidly change, resulting in frequent new model versions, the streamlining of the deployment of the models provides a significant advantage in time savings.

Examples of fields that might produce moderately changing models 803 include such fields as manufacturing, transportation, education, energy, etc. In a moderately changing model 803, the models may be created periodically or in response to events that occur at a moderately rate. In the moderately changing models 803, the systems and methods may save time when the new model versions are created but have lesser time savings when compared to the rapidly changing models 801. Some data fields produce slowly changing models 805. Slowly changing models 805 may arise when the training data is fairly static, or the cost of acquiring new training data is prohibitively expensive. Examples of fields that may produce slowly changing models 805 may include astronomy, biology, finance, marketing, etc.

FIG. 8 also shows a graph 810 which illustrates the relationship between the rate of model change and the potential time savings of implementing the systems and methods described herein. As shown, as the rate of model change increases, the potential time savings from implementing the systems and methods described herein also increases.

FIG. 9 is a flowchart diagram of a method 900 for zero-code approach for model version upgrades. The method 900 begins at 901, where source data is received from one or more data sources. The method 900 then proceeds at 903, where multiple versions are generated for at least one model from the source data, wherein different versions of the at least one model are generated at different times.

Additionally, the method 900 proceeds at 905, where a dynamic merge is performed on output for the multiple versions into a dynamic schema. The method 900 proceeds at 907, where a user-defined configuration is acquired for an output schema. Further, an output schema is generated based on the user-defined configuration.

EXAMPLE EMBODIMENTS

Example 1 includes a system comprising: memory for storing data; and at least one processor configured to execute computer-readable instructions that direct the at least one processor to: receive source data from one or more data sources; apply an ingestion process to the source data for storing storage data in a data storage repository; generate one or more models from the storage data in the data storage repository; apply an output process to generate one or more output schemas based on the generated one or more models; and apply the one or more output schemas for providing data for use in a downstream pipeline; wherein at least one of the source data and the one or more models changes over time leading to different data type collections; wherein at least one of applying the ingestion process and applying the output process comprises directing the at least one processor to: perform a dynamic merge on the different data type collections to create a merged data type collection; acquire a user-defined configuration for the merged data type collection; and generate an output schema to the merged data type collection based on the user-defined configuration.

Example 2 includes the system of Example 1, wherein the user-defined configuration comprises source metadata, wherein the at least one processor uses the source metadata to identify information sources.

Example 3 includes the system of Example 2, wherein the user-defined configuration further comprises: join metadata, wherein the at least one processor uses the join metadata to identify different combinations of the identified information sources; and mapping metadata, wherein the at least one processor uses the join metadata to generate the output schema based on at least one combination in the different combinations of the identified information sources.

Example 4 includes the system of Example 3, wherein the user-defined configuration comprises filter metadata, wherein the at least one processor uses the filter metadata to identify a subset of data in the at least one combination to include the output schema.

Example 5 includes the system of any of Examples 1-4, wherein the different data type collections are stored in a Delta format.

Example 6 includes the system of any of Examples 1-5, wherein performing the dynamic merge comprises performing an automatic schema evolution for a Delta lake merge.

Example 7 includes the system of any of Examples 1-6, wherein the one or more models are generated for performing fraud analysis and change frequently over time in response to changes to detect new fraud techniques.

Example 8 includes a method comprising: receiving source data from one or more data sources; generating multiple versions for at least one model from the source data, wherein different versions of the at least one model are generated at different times; performing a dynamic merge on output for the multiple versions into a dynamic schema; acquiring a user-defined configuration for an output schema; and generating an output schema based on the user-defined configuration.

Example 9 includes the method of Example 8, wherein the user-defined configuration comprises source metadata that identifies information sources.

Example 10 includes the method of Example 9, wherein the user-defined configuration further comprises: join metadata that identifies different combinations of the identified information sources; and mapping metadata that maps combinations of the identified information sources in the join metadata to a downstream pipeline.

Example 11 includes the method of any of Examples 8-10, wherein the user-defined configuration comprises filter metadata that identifies a subset of data in at least one combination to include the output schema.

Example 12 includes the method of any of Examples 8-11, further comprising: receiving additional data from the one or more data sources at a different time; and performing an additional merge on the additional data with the source data.

Example 13 includes the method of any of Examples 8-12, wherein the output for the multiple versions are stored in a Delta format.

Example 14 includes the method of any of Examples 8-13, wherein the at least one model is generated for performing fraud analysis.

Example 15 includes a system comprising: memory for storing data; and at least one processor configured to execute computer readable instructions that direct the at least one processor to: receive source data from one or more data sources; apply an ingestion process to the source data for storing storage data in a data storage repository; generate one or more models from the data storage repository; apply an output process to generate one or more output schemas based on the generated one or more models; and apply the one or more output schemas for providing data for use in a downstream pipeline; wherein at least one of the source data and the one or more models changes over time leading to different data type collections; wherein the output process comprises directing the at least one processor to perform a configuration driven dynamic schema evolution, wherein the configuration driven dynamic schema evolution directs the at least one processor to: perform a dynamic merge on the different data type collections to create a merged data type collection; acquire a user-defined configuration for the merged data type collection; and generate an output schema to the merged data type collection based on the user-defined configuration.

Example 16 includes the system of Example 15, wherein the user-defined configuration comprises source metadata, wherein the at least one processor uses the source metadata to identify information sources.

Example 17 includes the system of Example 16, wherein the user-defined configuration further comprises: join metadata, wherein the at least one processor uses the join metadata to identify different combinations of the identified information sources; and mapping metadata, wherein the at least one processor uses the join metadata to generate the output schema based on at least one combination in the different combinations of the identified information sources.

Example 18 includes the system of Example 17, wherein the user-defined configuration comprises filter metadata, wherein the at least one processor uses the filter metadata to identify a subset of data in the at least one combination to include the output schema.

Example 19 includes the system of any of Examples 15-18, wherein the ingestion process comprises directing the at least one processor to perform the configuration driven dynamic schema evolution.

Example 20 includes the system of any of Examples 15-19, wherein the one or more models are generated for performing fraud analysis and change frequently over time in response to changes to detect new fraud techniques.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
memory for storing data; and
at least one processor configured to execute computer-readable instructions that direct the at least one processor to:
receive source data from one or more data sources;

apply an ingestion process to the source data for storing storage data in a data storage repository;

generate one or more models from the storage data in the data storage repository, wherein one or more versions of at least one model from the one or more models are generated in response to variations in the received source data;

apply an output process to generate one or more output schemas based on the generated one or more models; and apply the one or more output schemas for providing data for use in a downstream pipeline;

wherein at least one of the source data and the one or more models changes over time leading to different data type collections;

wherein at least one of applying the ingestion process and applying the output process comprises directing the at least one processor to:

perform a dynamic merge on the different data type collections to create a merged data type collection, wherein the merged data type collection integrates schema variations across the one or more versions of the at least one model into a single dynamic schema;

acquire a user-defined configuration for the merged data type collection, wherein the user-defined configuration comprises join metadata to identify combinations of the one or more data sources to be joined to generate an output schema; and generate the output schema to the merged data type collection using a dynamic schema-on-read mechanism, wherein the dynamic schema-on-read mechanism generates the schema at the time of data access based on evaluation of the join metadata of the user-defined configuration.

2. The system of claim 1, wherein the user-defined configuration comprises source metadata, wherein the at least one processor uses the source metadata to identify information sources.

3. The system of claim 2, wherein the user-defined configuration further comprises:

mapping metadata, wherein the at least one processor uses the join metadata to generate the output schema based on at least one combination in the different combinations of the identified information sources.

4. The system of claim 3, wherein the user-defined configuration comprises filter metadata, wherein the at least one processor uses the filter metadata to identify a subset of data in the at least one combination to include the output schema.

5. The system of claim 1, wherein the different data type collections are stored in a Delta format.

6. The system of claim 1, wherein performing the dynamic merge comprises performing an automatic schema evolution for a Delta lake merge.

7. The system of claim 1, wherein the one or more models are generated for performing fraud analysis, wherein the one or more models are updated at predetermined time intervals in response to changes to detect new fraud techniques.

8. A method comprising:

receiving by a processor, source data from one or more data sources;

apply by the processor, an ingestion process to the source data for storing storage data in a data storage repository;

generating by the processor, multiple versions for at least one model from the storage data in the data storage repository, wherein the multiple versions of the at least one model are generated at different times based on variations in the source data;

performing by the processor, a dynamic merge for the multiple versions for the at least one model into a single dynamic schema;

acquiring by the processor, a user-defined configuration for an output schema, wherein the user-defined configuration comprises join metadata to identify combinations of the one or more data sources to be joined to generate the output schema; and generating by the processor, the output schema using a dynamic schema-on-read mechanism, wherein the dynamic schema-on-read mechanism generates the schema at the time of data access based on evaluation of the join metadata of the user-defined configuration.

9. The method of claim 8, wherein the user-defined configuration comprises source metadata that identifies information sources.

10. The method of claim 9, wherein the user-defined configuration further comprises:

mapping metadata that maps combinations of the identified information sources in the join metadata to a downstream pipeline.

11. The method of claim 8, wherein the user-defined configuration comprises filter metadata that identifies a subset of data in at least one combination to include the output schema.

12. The method of claim 8, further comprising:

receiving additional data from the one or more data sources at a different time; and performing an additional merge on the additional data with the source data.

13. The method of claim 8, wherein the output for the multiple versions are stored in a Delta format.

14. The method of claim 8, wherein the at least one model is generated for performing fraud analysis.

15. A system comprising:

a memory for storing data; and at least one processor configured to execute computer readable instructions that direct the at least one processor to:

receive source data from one or more data sources;

apply an ingestion process to the source data for storing storage data in a data storage repository;

generate one or more models from the data storage repository, wherein one or more versions of at least one model from the one or more models are generated in response to variations in the received source data;

apply an output process to generate one or more output schemas based on the generated one or more models; and apply the one or more output schemas for providing data for use in a downstream pipeline;

wherein at least one of the source data and the one or more models changes over time leading to different data type collections;

wherein the output process comprises directing the at least one processor to perform a configuration driven dynamic schema evolution, wherein the configuration driven dynamic schema evolution directs the at least one processor to:

perform a dynamic merge on the different data type collections to create a merged data type collection, wherein the merged data type collection integrates schema variations across the one or more versions of the at least one model into a single dynamic schema;

acquire a user-defined configuration for the merged data type collection, wherein the user-defined configuration comprises join metadata to identify combinations of the one or more data sources to be joined to generate an output schema; and generate the output schema to the merged data type collection using a dynamic schema-on-read mechanism, wherein the dynamic schema-on-read mechanism generates the schema at the time of data access based on evaluation of the join metadata of the user-defined configuration.

16. The system of claim 15, wherein the user-defined configuration comprises source metadata, wherein the at least one processor uses the source metadata to identify information sources.

17. The system of claim 16, wherein the user-defined configuration further comprises:

mapping metadata, wherein the at least one processor uses the join metadata to generate the output schema based on at least one combination in the different combinations of the identified information sources.

18. The system of claim 17, wherein the user-defined configuration comprises filter metadata, wherein the at least one processor uses the filter metadata to identify a subset of data in the at least one combination to include the output schema.

19. The system of claim 15, wherein the ingestion process comprises directing the at least one processor to perform the configuration driven dynamic schema evolution.

20. The system of claim 15, wherein the one or more models are generated for performing fraud analysis, wherein the one or more models are updated at predetermined time intervals in response to changes to detect new fraud techniques.

* * * * *